United States Patent [19]

Fohl et al.

[11] Patent Number: 5,771,326

[45] Date of Patent: Jun. 23, 1998

[54] VISCOUS LIGHT TRAP FOR A LASER-BASED FIBER OPTIC VEHICLE LIGHTING SYSTEM

[75] Inventors: Timothy Fohl, Carlisle, Mass.; Michael Anthony Marinelli, Northville; Jeffrey Thomas Remillard, Ypalanti, both of Mich.

[73] Assignee: Ford Global Technologies, Inc., Dearborn, Mich.

[21] Appl. No.: 886,885

[22] Filed: Jul. 2, 1997

[51] Int. Cl.$^6$ .................................................. G02B 6/02
[52] U.S. Cl. ........................... 385/123; 385/901; 362/32
[58] Field of Search ................................. 385/123–128, 385/115, 120, 121, 901; 362/32, 31

[56] References Cited

U.S. PATENT DOCUMENTS

| | | |
|---|---|---|
| 3,874,783 | 4/1975 | Cole ......................................... 385/115 |
| 4,790,618 | 12/1988 | Abe ............................................ 385/88 |
| 4,994,791 | 2/1991 | Taylor ........................................ 385/95 |
| 5,087,109 | 2/1992 | Ishizuka et al. ........................... 385/34 |
| 5,107,533 | 4/1992 | Jaskie ........................................ 385/18 |
| 5,434,754 | 7/1995 | Li et al. .................................... 362/31 |
| 5,495,400 | 2/1996 | Currie ....................................... 362/32 |
| 5,500,911 | 3/1996 | Roff .......................................... 385/76 |
| 5,700,078 | 12/1997 | Fohl et al. ................................. 362/32 |

*Primary Examiner*—Phan T. H. Palmer
*Attorney, Agent, or Firm*—Steven A. Maynard

[57] ABSTRACT

A fiber optic light guide for a vehicle lighting system has a light transmissive core and a cladding provided circumferentially about the core. A light absorptive viscous fluid is disposed intermediate the light transmissive core and the cladding, so that if the fiber optic light guide is severed, and the light transmissive core is exposed, the viscous fluid will flow over and cover the exposed light transmissive core.

14 Claims, 1 Drawing Sheet

VISCOUS LIGHT TRAP FOR A LASER-BASED FIBER OPTIC VEHICLE LIGHTING SYSTEM

FIELD OF THE INVENTION

The present invention relates to laser-based fiber optic vehicle lighting systems, and more specifically, to a viscous light trap for such systems.

BACKGROUND OF THE INVENTION

Conventional light systems, used for vehicle head lights or tail lights, typically use a bulb and reflector system. In a bulb and reflector system, the filament of the bulb is placed at or near a focal point of a parabolic reflector. The light emitted by the bulb filament is collected by the reflector and reflected outward to form a light beam. A lens may be used to shape the light beam into a specified pattern.

The conventional bulb and reflector systems have several disadvantages. For example, bulb and reflector systems collect and often reflect only thirty percent of the light emitted from the bulb filament into the useful lighting area. Additionally, thermal energy given off by the bulb during operation must be considered. The size of the reflector as well as the material used in its construction vary depending upon the amount of thermal energy generated by the bulb filament. Decreasing the size of the reflector requires use of materials with high thermal resistivity for the reflector. Further, bulb and reflector systems have disadvantages related to aerodynamics and aesthetic styling. For example, the depth of the reflector along its focal axis and the height of the reflector in directions perpendicular to the focal axis greatly limit attempts at streamlining vehicle contours.

An approach to develop an automotive lighting system directed at remedying the above disadvantages and for use with the newer streamlined vehicle contours is proposed in U.S. Pat. No. 5,434,754, assigned to the assignee of the present invention. Therein disclosed is the combination of a fiber optic light guide which transmits light from a remote light source, to a parabolic reflector, through a light manifold, and to a thin sheet optical element.

Certain advancements on such an approach have been directed at reducing the thickness of the thin sheet optical element. One way of accomplishing this reduction is by utilizing a high brightness remote light source. One approach is to provide a remote diode laser light source in combination with reduced diameter fiber optic light guides and reduced thickness optical elements. U.S. application Ser. No. 08/780,034 now U.S. Pat. No. 5,700,078, assigned to the assignee of the present invention, is exemplary of such an approach.

One disadvantage with such a system is that the reduced diameter fiber optic light guides may become severed over the life of the vehicle lighting system. If the light guides should be severed, the uncontrolled emission of laser light from the light guide is a condition to be avoided.

It is therefore desirable, particularly when using diode laser remote lighting systems, to provide for the prevention of emission of laser light beyond the confines of the system if the fiber optic light guides are severed.

SUMMARY OF THE INVENTION

Responsive to the deficiencies in the prior art, the present invention provides a fiber optic light guide for a vehicle lighting system having a light transmissive core with a longitudinal axis, a cladding provided circumferentially about and longitudinally coextensive with the light transmissive core, and an optically absorptive viscous fluid disposed intermediate the light transmissive core and the cladding, so that if the fiber optic light guide is severed and the light transmissive core is exposed, the optically absorptive viscous fluid will flow over and cover the exposed light transmissive core.

According to a feature of the present invention, the optically absorptive viscous fluid is a silicone fluid.

An advantage of the present invention is that if the fiber optic light guide is severed the light absorptive viscous fluid will flow over and cover the light transmissive core. The fluid prevents the emission of laser light at the severing point by trapping the light within the fluid. dr

BRIEF DESCRIPTION OF THE DRAWINGS

Other features and advantages of the present invention will become apparent to those skilled in the automotive vehicle lighting arts upon reading the following description with reference to the accompanying drawings, in which.

DETAILED DESCRIPTION OF THE PREFERRED EMBODIMENT

Figure 1:
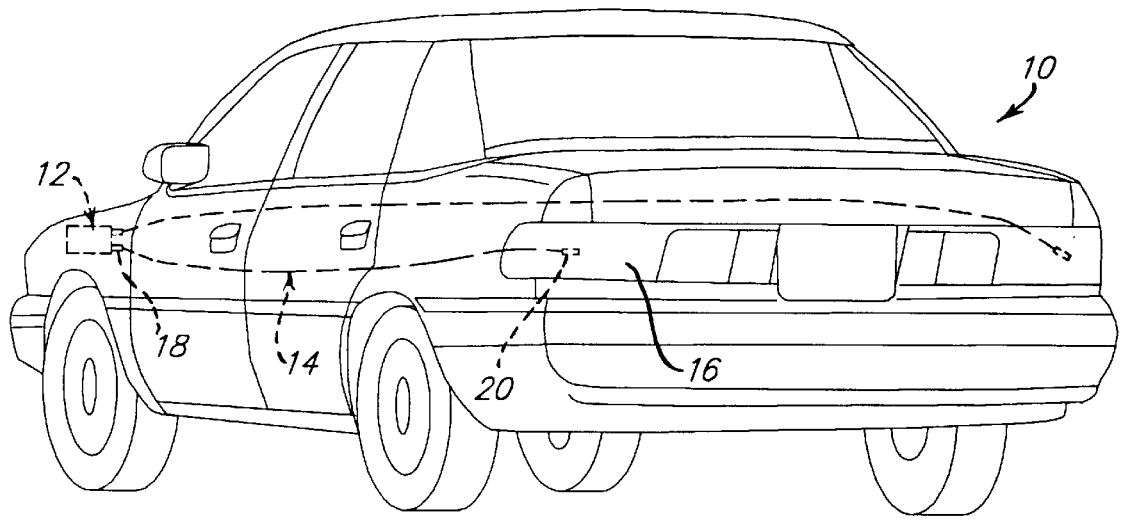
FIG. 1 is a perspective view of an automotive vehicle having a remote light source lighting system.

Turning now to the drawings, and in particular to FIG. 1 thereof, an automotive vehicle 10 is shown having a vehicle lighting system using, a remote diode laser light source 12, a fiber optic light guide 14, and an optical element 16. The optical element 16 is preferably a uniform thickness thin sheet and is here shown as a tail lamp. The fiber optic light guide 14 has a first end 18 optically connectable to the remote laser light source 12 and a second end 20 optically connectable to the optical element 16.

Figure 2:
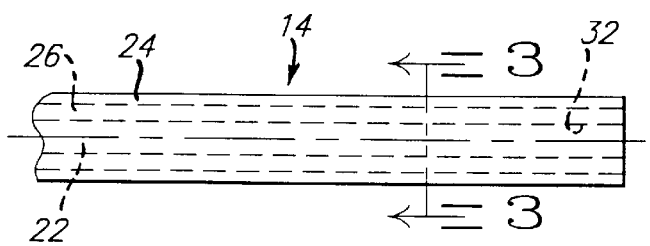
FIG. 2 is a side view of a fiber optic light guide according to the present invention.
Figure 3:
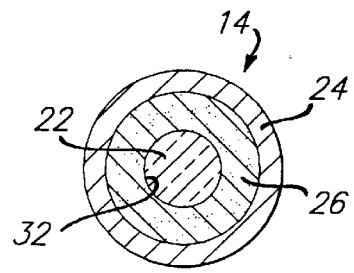
FIG. 3 is a sectional view of the fiber optic light guide of FIG. 2 taken along the line 3—3.
Figure 4:
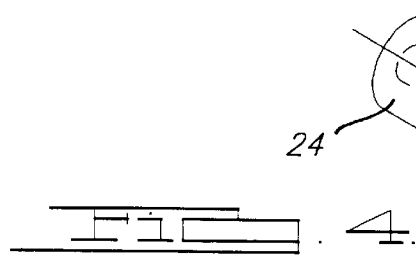
FIG. 4 is a perspective view of a cut-away of a fiber optic light guide according to the present invention.

Turning now to FIGS. 2–4, the fiber optic light guide 14 is illustrated as having a light transmissive core 22 and an outer cladding 24. Disposed intermediate the light transmissive core and the outer cladding is a viscous fluid 26.

The light transmissive core 22 is preferably formed of glass fiber. The core 22 has a coating 32 which has an index of refraction lower than the core 22. The contact area between the core 22 and the coating 32 is a core/coating interface. The core/coating interface has a predetermined critical angle explained in more detail below associated therewith which is dependent upon the respective indices of refraction of the core 22 and coating 32. The light transmissive core 22 has a longitudinal axis 30 and a predetermined length.

The outer cladding 24 circumferentially overlies and is axially coextensive with the viscous fluid 26 and core 22. The cladding 24 is composed preferably of a flexible polymeric material.

As best shown in FIG. 3, the viscous fluid 26 is disposed intermediate the core 22 and cladding 24 and is preferably a light absorptive fluid. The light absorptive quality of the viscous fluid 26 is preferably accomplished by adding carbon black to the fluid in predetermined quantities in order to obtain a proper balance between viscosity and optical absorption. The viscous fluid 26 preferably has a wide service temperature range, experiences small changes in viscosity with temperature fluctuation, and exhibits thermal stability, chemical inertness, and low toxicity. Exemplary of such fluids are a silicone fluids. Silicone fluids have viscosities ranging from $0.65-2.5 \times 10^6$ centi-Stokes ("cSt."). At viscosities greater than 1000 cSt. physical properties such as surface tension and viscosity become substantially insensitive to temperature changes.

In use, light is emitted from the remote laser light source 12, received by the fiber optic light guide 14, transmitted through the fiber optic light guide 14 via total internal reflection ("TIR"), and emitted incident upon the optical element 16. TIR of light occurs when an incident angle exceeds a critical angle $\Pi_c$ given by the equation $\Pi_c = \sin^{-1}(n_2/n_1)$ wherein $n_1$ is the refractive index of the material through which light is propagating, the core 22 in the present invention, and $n_2$ is the index of refraction of the surrounding medium, the coating 32 in the present invention, and $n_2$ is less than $n_1$. Light rays striking the core/coating interface 26 at an angle greater than the critical angle propagate down the length of the core 22 by repeatedly striking and totally internally reflecting off the core/perimeter interface.

Figure 5:
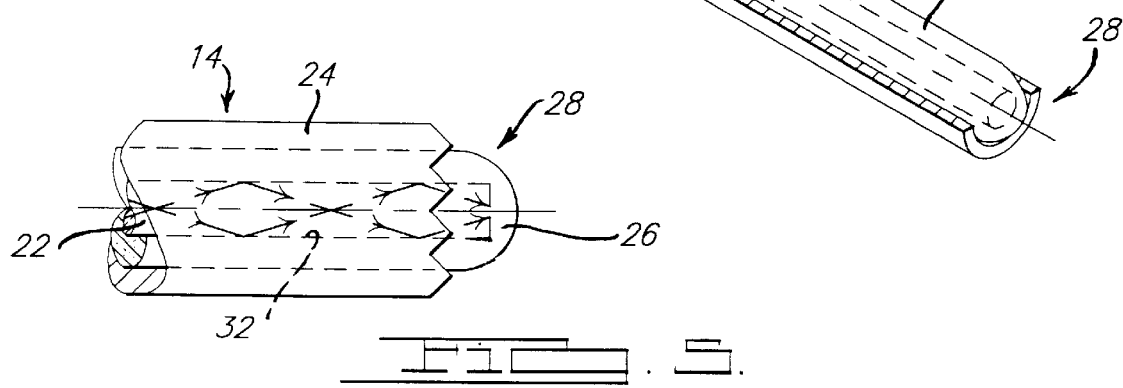
FIG. 5 is a close up view of a severed fiber optic light guide according to the present invention.

If the fiber optic light guide 14 should become severed at any point there along, the severing point referred to generally as 28 in FIGS. 4 and 5, the light absorptive viscous fluid 26 will flow over and encapsulate the exposed light transmissive core 22 as shown. The light propagating along the core 22 encounters the viscous fluid 26 and is absorbed, thus trapping the light within the light guide at the severing point 28. Trapping the light within the viscous fluid 26 is advantageous because it prevents the emission of laser light from the light guide 14.

Only one embodiment of a viscous light trap for a fiber optic vehicle lighting system of the present invention has been described. Those skilled in the automotive lighting arts will appreciate that others may be possible without departing from the scope of the following claims.

We claim:

1. A fiber optic light guide for a vehicle lighting system, comprising:

a light transmissive core having a longitudinal axis;

a cladding provided circumferentially about and longitudinally coextensive with the light transmissive core; and an optically absorptive viscous fluid disposed intermediate the light transmissive core and the cladding, so that if the fiber optic light guide is severed and the light transmissive core is exposed the viscous fluid will flow over and cover the exposed light transmissive core.

2. The fiber optic light guide of claim 1, wherein the viscous fluid is a silicone fluid.

3. The fiber optic light guide of claim 2, wherein the silicone fluid has a viscosity chosen from the range of 0.65 to $2.5 \times 10^6$ centi-Stokes.

4. The fiber optic light guide of claim 1, wherein the optically absorptive viscous fluid has a carbon black additive.

5. The fiber optic light guide of claim 1, wherein the light transmissive core is formed from a glass fiber.

6. The fiber optic light guide of claim 1, wherein the cladding is a flexible polymeric material.

7. A vehicle lighting system, comprising:

a remote light source;

an optical element; and a fiber optic light guide, including:

a light transmissive core having a longitudinal axis;

a cladding provided circumferentially about and longitudinally coextensive with the light transmissive core; and a light absorptive viscous fluid disposed intermediate the light transmissive core and the cladding, so that if the fiber optic light guide is severed and the light transmissive core is exposed the viscous fluid will flow over and cover the exposed light transmissive core.

8. The vehicle lighting system of claim 7, wherein the viscous fluid is a silicone fluid.

9. The vehicle lighting system of claim 8, wherein the silicone fluid has a viscosity chosen from the range of 0.65 to $2.5 \times 10^6$ centi-Stokes.

10. The vehicle lighting system of claim 7, wherein the optically absorptive fluid has a carbon black additive.

11. The fiber optic light guide of claim 7, wherein the light transmissive core is formed from a glass fiber.

12. The fiber optic light guide of claim 7, wherein the cladding is a flexible polymeric material.

13. The fiber optic light guide of claim 7, wherein the optical element is a uniform thickness thin sheet.

14. The fiber optic light guide of claim 7, wherein the remote light source is a diode laser.

* * * * *